United States Patent
Shim et al.

(10) Patent No.: US 10,026,965 B2
(45) Date of Patent: Jul. 17, 2018

(54) METHOD FOR MANUFACTURING ELECTRODE STRUCTURE FOR FLEXIBLE ENERGY STORAGE DEVICE, ELECTRODE STRUCTURE MANUFACTURED THEREBY, AND ENERGY STORAGE DEVICE INCLUDING SAME

(71) Applicant: KOREA INSTITUTE OF MACHINERY & MATERIALS, Daejeon (KR)

(72) Inventors: Hyung Cheoul Shim, Daejeon (KR); Seung Min Hyun, Daejeon (KR); Sunghwan Chang, Daejeon (KR); Jeong Hwan Kim, Daejeon (KR); Jun-ho Jeong, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 15/032,090

(22) PCT Filed: Apr. 30, 2015

(86) PCT No.: PCT/KR2015/004438
§ 371 (c)(1),
(2) Date: Apr. 26, 2016

(87) PCT Pub. No.: WO2015/167302
PCT Pub. Date: Nov. 5, 2015

(65) Prior Publication Data
US 2017/0125818 A1   May 4, 2017

(30) Foreign Application Priority Data

Apr. 30, 2014   (KR) .................. 10-2014-0052236

(51) Int. Cl.
*H01M 4/04*   (2006.01)
*H01M 4/66*   (2006.01)
(Continued)

(52) U.S. Cl.
CPC ............ *H01M 4/668* (2013.01); *H01G 11/26* (2013.01); *H01G 11/36* (2013.01); *H01G 11/54* (2013.01);
(Continued)

(58) Field of Classification Search
None
See application file for complete search history.

(56) References Cited

U.S. PATENT DOCUMENTS

| 9,876,160 B2* | 1/2018 | Biggs ...................... H01L 41/29 |
| 2007/0020514 A1* | 1/2007 | Ozaki ..................... H01M 4/02 429/121 |

(Continued)

FOREIGN PATENT DOCUMENTS

| JP | 2008-218125 | 9/2008 |
| KR | 10-2000-0067311 | 11/2000 |

(Continued)

OTHER PUBLICATIONS

European Patent Office, Extended European Search Report of the corresponding European Patent Application No. 15786327.5, dated Nov. 28, 2016.
(Continued)

*Primary Examiner* — Scott J Chmielecki
(74) *Attorney, Agent, or Firm* — Lex IP Meister, PLLC

(57) ABSTRACT

An exemplary embodiment of the present invention provides a manufacturing method of an electrode structure for an energy storage device, the method including: forming a polymer substrate configured to have a first uneven pattern on a first surface; forming an electrode active material layer
(Continued)

on the first uneven pattern in a state that an tensile force is applied to the polymer substrate; and forming a second uneven pattern on the polymer substrate and the electrode active material layer by removing the tensile force.

7 Claims, 11 Drawing Sheets

(51) Int. Cl.
*H01G 11/36* (2013.01)
*H01G 11/26* (2013.01)
*H01G 11/86* (2013.01)
*H01G 11/54* (2013.01)
*H01M 10/0525* (2010.01)

(52) U.S. Cl.
CPC .......... *H01G 11/86* (2013.01); *H01M 4/0404* (2013.01); *H01M 10/0525* (2013.01); *H01M 2220/30* (2013.01)

(56) References Cited

U.S. PATENT DOCUMENTS

| | | | |
|---|---|---|---|
| 2008/0213671 A1 | 9/2008 | Kogetsu | |
| 2009/0100669 A1 | 4/2009 | Ikeda | |
| 2009/0280407 A1* | 11/2009 | Ito | H01M 4/66 |
| | | | 429/209 |
| 2011/0070492 A1 | 3/2011 | Yamamoto | |
| 2013/0040229 A1 | 2/2013 | Grigorian | |
| 2013/0115512 A1 | 5/2013 | Jiang | |
| 2015/0034237 A1* | 2/2015 | Biggs | H01L 41/047 |
| | | | 156/234 |
| 2015/0364789 A1* | 12/2015 | Ogawa | H01G 11/30 |
| | | | 429/314 |

FOREIGN PATENT DOCUMENTS

| | | |
|---|---|---|
| KR | 10-0666506 | 1/2007 |
| KR | 10-0714128 | 4/2007 |
| KR | 10-2008-0052175 | 6/2008 |
| KR | 10-2010-0068580 | 6/2010 |
| KR | 10-1256066 | 4/2013 |
| KR | 10-2013-0130292 | 12/2013 |
| KR | 10-2014-0006573 | 1/2014 |
| WO | 2009-142009 | 11/2009 |

OTHER PUBLICATIONS

Volta, Alessandro, "On the Electricity Excited by the Mere Contact of Conducting Substances of Different Kinds. In a Letter from Mr. Alexander Volta, F. R. S. Professor of Natural Philosophy in the University of Pavia, to the Rt. Hon. Sir Joseph Banks, Bart. K. B. P. R. S.", Philosophical Transactions of the royal society of London, vol. 90, Jun. 26, 1800, pp. 403-431.

Chen Zhao et al. "Intrinsically Stretchable Supercapacitors Composed of Polypyrrole Electrodes and Highly Stretchable Gel Electrolyte" ACS Appl. Mater. Interfaces, Aug. 15, 2013, 5, pp. 9008-9014.

* cited by examiner (a)

Pre-pattern is formed by using mold (b)

(c)

(a)

(b)

(a)

Pre-pattern is formed by using mold (b)

(c)

(a)

(b)

(c)

METHOD FOR MANUFACTURING ELECTRODE STRUCTURE FOR FLEXIBLE ENERGY STORAGE DEVICE, ELECTRODE STRUCTURE MANUFACTURED THEREBY, AND ENERGY STORAGE DEVICE INCLUDING SAME

TECHNICAL FIELD

The present invention relates to an electrode structure for an energy storage device, and more particularly to the present invention relates to a manufacturing method of an electrode structure for an extensible energy storage device, an electrode structure manufactured by the same method, and an energy storage device including the same structure.

BACKGROUND ART

As a wearable device such as a google glass, a smart watch, a fitness band, and the like is emerging, a technique for related elements becomes more important.

A battery or a rechargeable battery employed in the wearable device is restricted in a shape or a size for a design of the wearable device and is required to operate the device for a long time when it is once installed or charged. Accordingly, an energy storage device for the wearable device is required to maximize an energy density for being capable of storing a large amount of energy in a confined space and is also required to have extensity and flexibility for being employed in the wearable device.

Most conventional techniques for making a battery flexible are based on simply coating a battery active material on a flexible substrate or connecting cells including an active material by using extensible connectors. For example, "rechargeable battery having non-metallic current collector and method of manufacturing the same" (Korean Patent No. 10-0714128; published on May 2, 2007) discloses a technique of coating a positive electrode layer and a negative electrode layer on a polymer film having excellent bendability.

However, such methods may cause a bonding problem between a flexible substrate and an active material layer when it is contracted or elongated due to an elongation difference between the substrate and a battery active material. Further, when a thickness of the active material layer is reduced to secure flexibility, the energy density thereof decreases, and when the thickness is increased, the flexibility decreases, so the active material layer may be broken. Furthermore, in the case of employing the extensible connectors which connect the cells, a problem that the energy density deteriorates may arise because the active material may not be charged as much as spaces occupied by the extensible connectors.

DISCLOSURE

Technical Problem

An object of the present invention is to solve the above-mentioned problems and other problems. The present invention has been made in an effort to provide a manufacturing method of an electrode structure for an extensible energy storage device, an electrode structure manufactured by the same method, and an energy storage device such as a battery, a capacitor, or the like including the same electrode structure, capable of improving energy density and accomplishing structural extensity by applying a tensile force a substrate having a surface that is pre-patterned to have a first uneven pattern such that a second uneven pattern is formed thereon to maximize a surface thereof.

The present invention has also been made in an effort to provide a manufacturing method of an electrode structure for an extensible energy storage device, an electrode structure manufactured by the same method, and an energy storage device including the same electrode structure, capable of improving a bonding strength between an extensible substrate, a conductive thin film, and an active material layer to prevent breakage in spite of repeated extension and contraction.

Technical Solution

An exemplary embodiment of the present invention provides a manufacturing method of an electrode structure for an energy storage device, the method including: forming a polymer substrate configured to have a first uneven pattern on a first surface thereof; forming an electrode active material layer on the first uneven pattern in a state that an tensile force is applied to the polymer substrate; and forming a second uneven pattern on the polymer substrate and the electrode active material layer by removing the tensile force.

Another exemplary embodiment of the present invention provides a manufacturing method of an electrode structure for an energy storage device, the method including: forming a polymer substrate configured to have a first uneven pattern on a first surface thereof; coating a carbon nanotube (CNT) network thin film on the first uneven pattern in a state that the tensile force is applied to the polymer substrate; applying the electrode active material layer on the CNT network thin film in the state that the tensile force is maintained; forming a second uneven pattern on the polymer substrate and the electrode active material layer by removing the tensile force; and radiating a microwave on the electrode active material.

An exemplary embodiment of the present invention provides an electrode structure for an energy storage device, the electrode structure including a polymer substrate configured to have a first uneven pattern that is formed on a surface thereof and a second uneven pattern that is formed on the first uneven pattern; and an electrode active material layer disposed on the polymer substrate to have the first uneven pattern and the second uneven pattern. The electrode structure may be manufactured by the above-described electrode structure manufacturing method.

Another exemplary embodiment of the present invention provides an electrode structure for an energy storage device, the electrode structure including a polymer substrate configured to have a first uneven pattern that is formed on a surface thereof and a second uneven pattern that is formed on the first uneven pattern; a carbon nanotube (CNT) network thin film formed on the polymer substrate to have the first uneven pattern and the second uneven pattern; and an electrode active material layer formed on the CNT network thin film to have the first uneven pattern and the second uneven pattern. The electrode structure may be manufactured by the above-described electrode structure manufacturing method.

Further, another exemplary embodiment of the present invention provides an energy storage device including a first electrode structure that serves as a positive electrode; a second electrode structure that serves as a negative electrode; and an electrolyte layer interposed between the first and second electrode structures. At least one of the first and second electrode structures may be manufactured by the above-described electrode structure manufacturing method.

Advantageous Effects

According to an exemplary embodiment of the present invention, it is possible to provide an electrode having an improved energy density and a structural extensity by applying a tensile force a substrate having a surface that is pre-patterned to have a first uneven pattern such that a second uneven pattern is formed thereon to maximize a surface thereof.

Conventionally, chemical etching or photolithography is used for implementing such an uneven structure, so an active material may be damaged or deformed. However, according to an exemplary embodiment of the present invention, a hierarchical structure in which a uneven pattern is formed on another uneven pattern can be formed by using a mold, i.e., by a forming method like stamping, which performs simple applying and removing of a tensile force after an uneven pattern is pre-formed.

Further, according to an exemplary embodiment of the present invention, a bonding strength between an extensible substrate, a conductive thin film, and an active material layer, constituting a current collector can be improved, and thus an electrode structure may not be broken even when the electrode structure is extended and contracted repeatedly.

According to an exemplary embodiment of the present invention, it is possible to improve an energy density in comparison with a conventional battery and also to accomplish flexibility by forming positive and negative electrode layers based on an extensible conductive current collector having a 3-dimensional structure that maximizes a specific surface area, so it can be readily applied to a wearable device.

MODE FOR INVENTION

Figure 1:
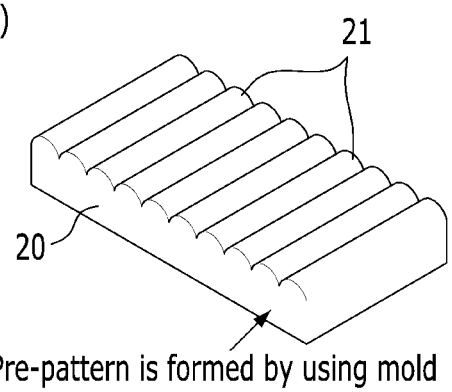
FIG. 1 illustrates an exemplary method of forming an uneven pattern on a polymer substrate according to an exemplary embodiment of the present invention.
Figure 1:
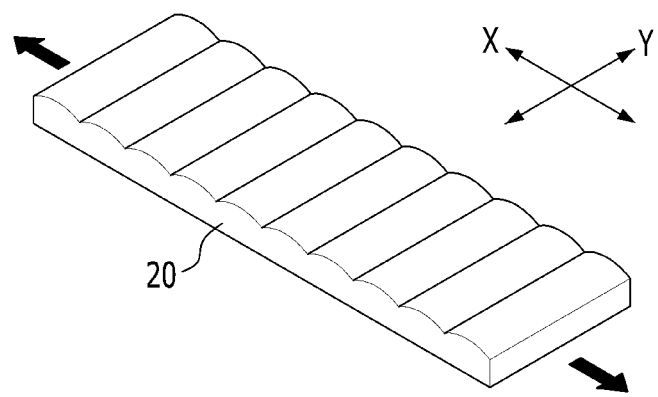
Figure 1:
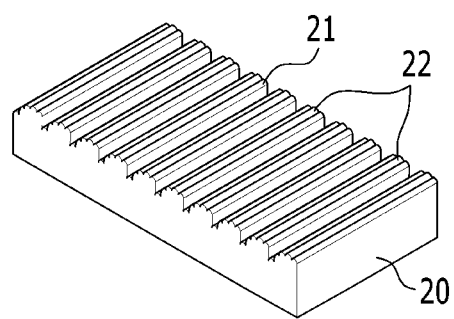

These and further objectives, characteristics, and advantages of the present invention will be apparent from the following descriptions and the accompanying drawings. However, the present invention is not limited to the following exemplary embodiments and may be modified in various different ways, all without departing from the spirit or scope of the present invention. The exemplary embodiments that are disclosed herein are provided so that the disclosed contents may become thorough and complete and the spirit of the present invention may be sufficiently understood to a person of an ordinary skill in the art.

It will be understood that when an element is referred to as being "on" another element, it can be directly on the other element or intervening elements may also be present. In the drawings, the thicknesses of layers, films, panels, regions, etc., are exaggerated for clarity.

Terms including ordinal numbers such as first, second, and the like may be used to describe various constituent elements, however the constituent elements are not limited by the terms. The terms are used only to distinguish one constituent element from other constituent elements. The description of the exemplary embodiments in each case also encompasses a corresponding complementary exemplary embodiment.

A singular expression includes a plural expression, unless clearly distinguished therefrom in a context. It will be understood that the term, "comprise", "include", "have", and the like are to designate an existence of a characteristic, a number, a step, a motion, a constituent element, a component, or a combination thereof, and not to exclude other existences of a characteristic, a number, a step, a motion, a constituent element, a component, or a combination thereof, or an additional possibility thereof.

Hereinafter, the present invention will be described more fully with reference to the accompanying drawings, in which exemplary embodiments of the present invention are shown. The following exemplary embodiments are merely examples for aiding comprehension of the present invention, and the scope of the present invention is not reduced or limited by the following exemplary embodiments. While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. In some cases, well-known elements of exemplary embodiments of the present invention will not be described in detail or will be omitted so as not to obscure the relevant details of the present invention.

FIG. 1 illustrates an exemplary method of forming an uneven pattern on a polymer substrate according to an exemplary embodiment of the present invention.

According to the exemplary embodiment of the present invention, an electrode structure in which a surface area thereof is increased so as to charge more amount of active material in the electrode structure is suggested. To that end, a first uneven pattern 21 is pre-formed on a flexible polymer substrate 20 as shown in FIG. 1(a). A method of forming the first uneven pattern 21 is not limited. For example, the first uneven pattern 21 may be formed on the polymer substrate 20 by using a mold. A shape and a size of the first uneven pattern 21 are not particularly limited, and an uneven pattern having a wave form is illustrated in FIG. 1.

Then, the tensile force is removed after a tensile force is applied to the polymer substrate 20 in a width direction (i.e., an X-direction) of the first uneven pattern 21 as shown in FIG. 1(b). Accordingly, the polymer substrate 20 returns to an initial length, thereby forming a second uneven pattern 22 on the first uneven pattern 21 as shown in FIG. 1(c). Accordingly, a specific surface area of the polymer substrate 20 may be maximized by forming a hierarchical structure in which the second uneven pattern 22 that is smaller than the first uneven pattern 21 is formed thereon.

Figure 2:
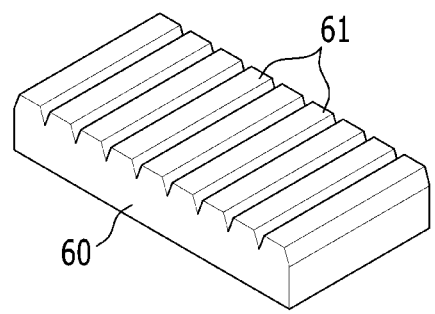
FIG. 2 illustrates another exemplary embodiment of a polymer substrate in which an uneven pattern may be formed.
Figure 2:
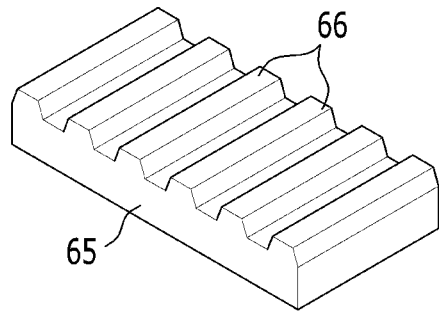
Figure 3:
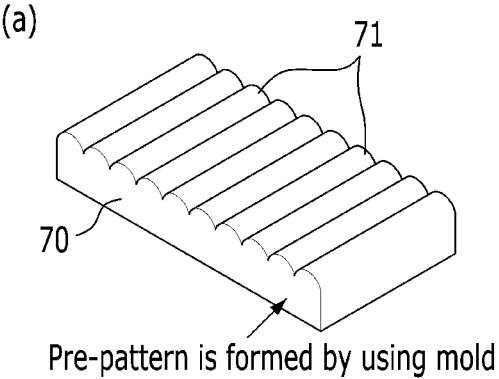
FIG. 3 illustrates a method of forming an uneven pattern on a polymer substrate according to a modification of the present invention.
Figure 3:
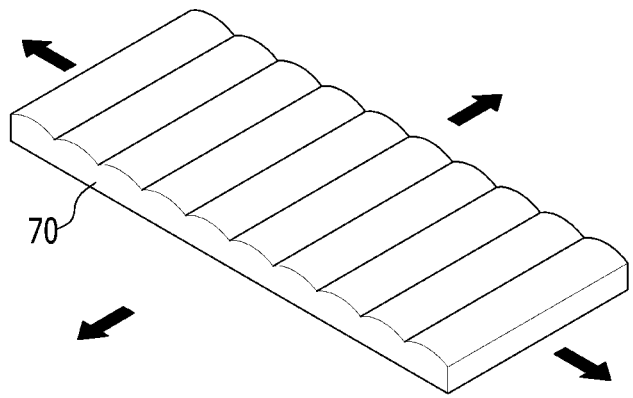
Figure 3:
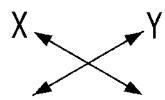
Figure 3:
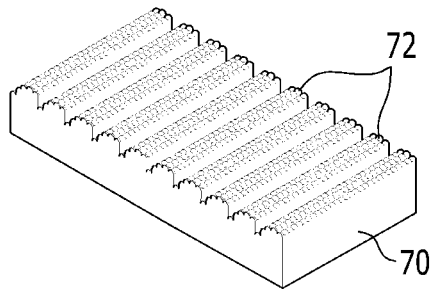
Figure 4:
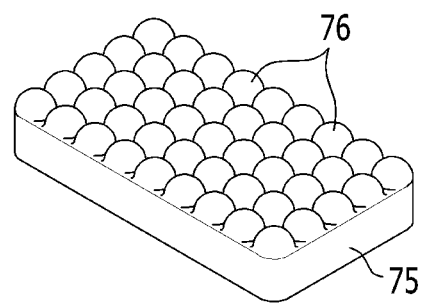
FIG. 4 illustrates a method of forming an uneven pattern on a polymer substrate according to a modification of the present invention.
Figure 4:
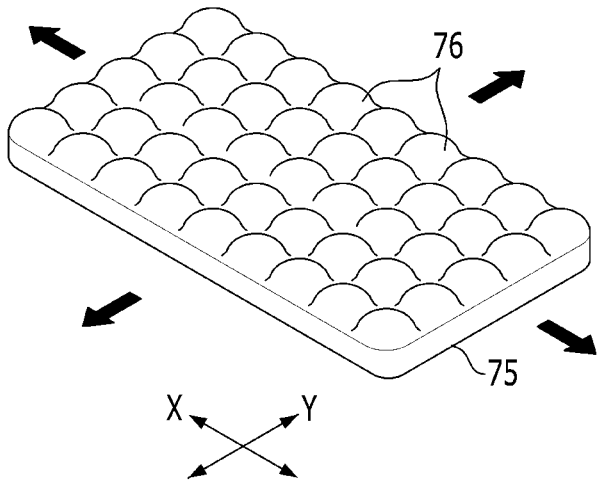
Figure 4:
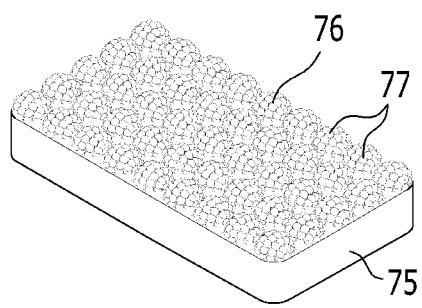

FIG. 2 illustrates another exemplary embodiments of a polymer substrate in which an uneven pattern may be formed, and uneven patterns having different shapes from that of FIG. 1 are illustrated. In the exemplary embodiment illustrated in FIG. 2(a), a polymer substrate 60 may have an uneven pattern 61 in which prominences are formed to have flat upper portions, and a polymer substrate 65 according to the exemplary embodiment illustrated in of FIG. 2(b) may have an uneven pattern 66 in which prominences and depressions are arranged at substantially same intervals. It will be understood that the uneven pattern may be formed in various different ways besides the exemplary embodiments illustrated in FIG. 1 and FIG. 2. FIG. 3 and FIG. 4 illustrate methods of forming an uneven pattern on a polymer substrate according to modifications of the present invention.

Referring to FIG. 3, a first uneven pattern 71 having a wave form similar to that of the polymer substrate 20 illustrated in FIG. 1 is pre-formed on a surface of an extensible polymer substrate 70 as shown in FIG. 3(a).

A tensile force is applied to the polymer substrate 70 in the width direction (i.e., the X-direction) and in a length direction (i.e., a Y-direction) of the first uneven pattern 71 as shown in FIG. 3(b). That is, the tensile force is applied to the polymer substrate 70 by pulling it in all directions unlike the exemplary embodiment illustrated in FIG. 1. Then, the tensile force is removed such that the polymer substrate 70 returns to an initial length, and thus a second uneven pattern 72 is formed on the first uneven pattern 71 as shown in FIG. 3(c). Accordingly, a surface area of the polymer substrate 70 may be maximized by forming a hierarchical structure in which the second uneven pattern 72 is formed on the first uneven pattern 71.

Referring to FIG. 4, a first uneven pattern 76 in which prominences are formed to have a hemispherical shape or a similar shape thereto is pre-formed on a surface of an extensible polymer substrate 75 as shown in FIG. 4(a). A tensile force is applied to the polymer substrate 75 in the width direction (i.e., the X-direction) and in the length direction (i.e., the Y-direction) of the first uneven pattern 76 as shown in of FIG. 4(b), and then removed such that the polymer substrate 75 returns to an initial length. Thus, a second uneven pattern 77 is formed on the first uneven pattern 76. Accordingly, a surface area of the polymer substrate 75 may be maximized by forming a hierarchical structure in which the second uneven pattern 77 is formed on the first uneven pattern 76.

Figure 5:
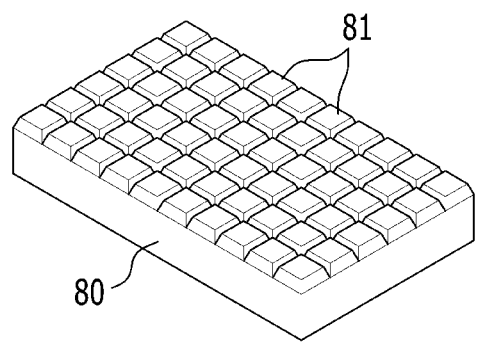
FIG. 5 illustrates a modification of a polymer substrate in which an uneven pattern may be formed.

FIG. 5 illustrates another modification of a polymer substrate. In this modification, an extensible polymer substrate 80 may have a uneven pattern 81 that is similar to the first uneven pattern 71 of FIG. 4 and has prominences whose surfaces are substantially flat, and a hierarchical structure of uneven patterns may be formed thereon by applying a tensile force to the polymer substrate 80 in the four directions and removing the tensile force as shown in FIG. 4.

As described above, a hierarchical structure of uneven patterns may be formed by applying a tensile force in one direction (the X or Y direction) or in two directions (the X and Y direction) to an extensible polymer substrate in which an uneven pattern is pre-formed. Herein, in the case that the tensile force is applied in the X and Y directions as an example, magnitudes of the tensile force in each direction may be different from each other, so that a shape of a formed uneven pattern may be variously modified.

Hereinafter, a manufacturing method of an electrode structure having a surface area which is maximized according to the above-described method will be described with reference to FIG. 6 and FIG. 7.

Figure 6:
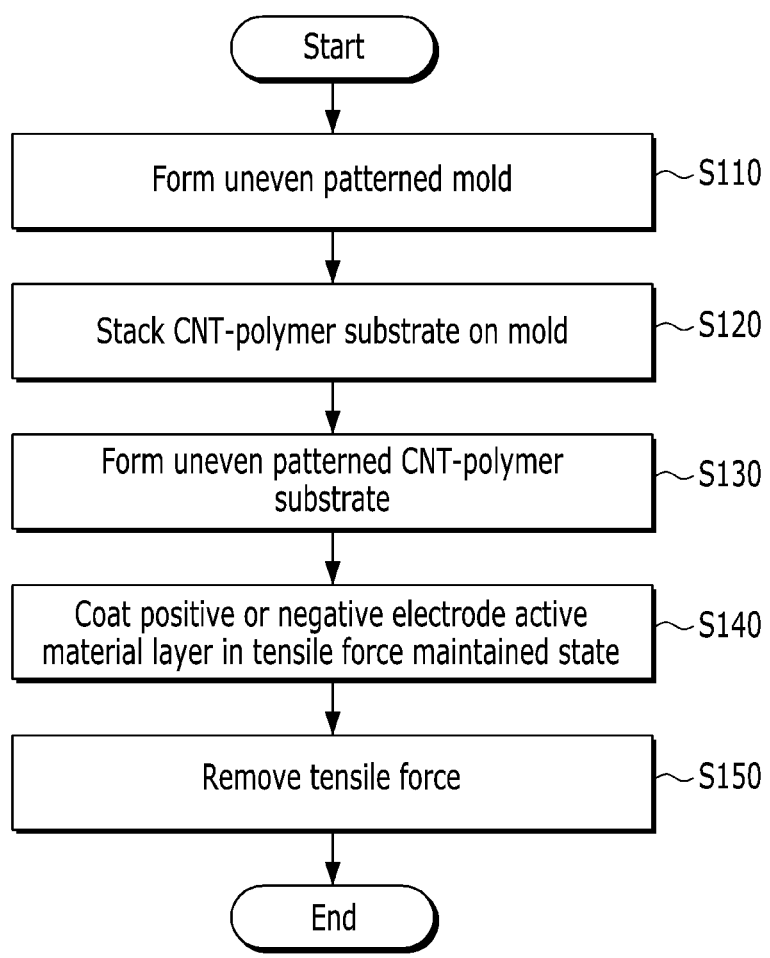
FIG. 6 is a flowchart illustrating a manufacturing method of an electrode structure according to a first exemplary embodiment of the present invention.
Figure 7:
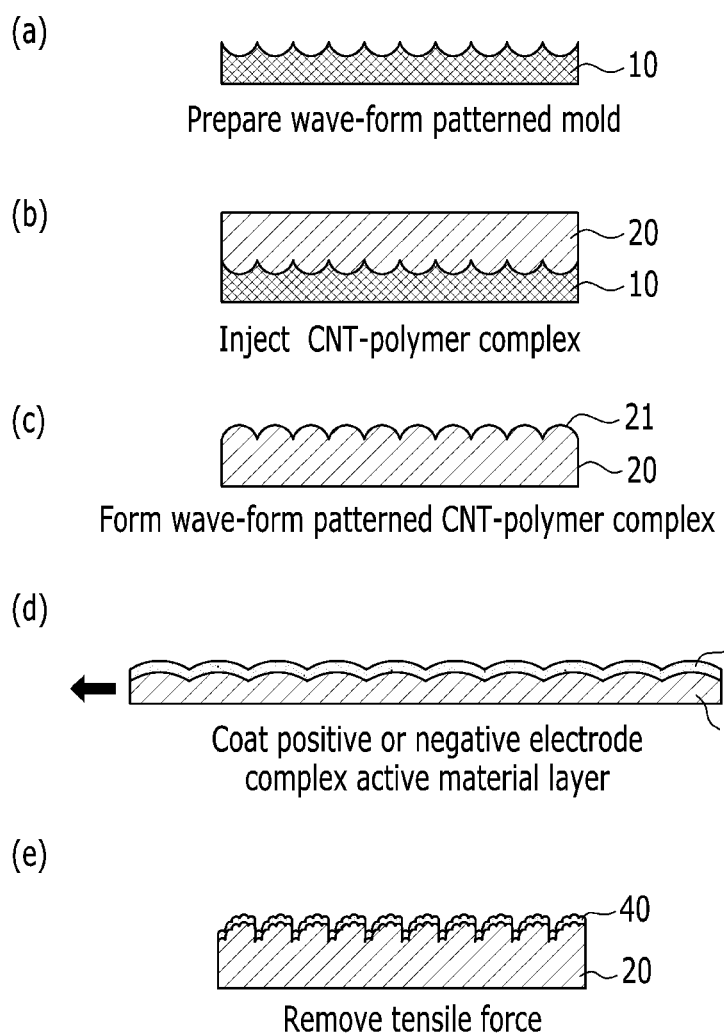
FIG. 7 schematically illustrates a manufacturing process of an electrode structure according to the method illustrated in FIG. 6.

FIG. 6 is a flowchart illustrating the manufacturing method of an electrode structure, which employs the above-described method, according to a first exemplary embodiment of the present invention, and FIG. 7 schematically illustrates the manufacturing process of the electrode structure according to the method illustrated in FIG. 6.

Referring to FIG. 6 and FIG. 7, first, a mold 10 in which an uneven pattern is formed is prepared in step S110. For convenience of description, for example, it is assumed that the uneven pattern is a wave pattern as shown in FIG. 7(a), and an interval of the pattern is about 10 µm. However, a shape and a size of the uneven pattern may vary depending on a specific embodiment as above-described with reference to FIG. 2 to FIG. 5.

Next, the polymer substrate 20 is stacked on a surface of the mold 10, on which the uneven pattern is formed in step S120, and the polymer substrate 20 is separated from the mold 10, thereby forming an uneven pattern 21 on the polymer substrate 20 in step S130.

In the exemplary embodiment of the present invention, the polymer substrate 20 may be formed of a polymer complex including a carbon nanotube (CNT), and a material for the polymer substrate 20 besides the CNT is not particularly limited as long as the material has extensible and flexible properties. Further the exemplary method of forming the uneven pattern 21 on the polymer substrate 20 by using the mold 10 is disclosed in the above steps from S110 to S130, but the method of forming the uneven pattern 21 on the polymer substrate 20 is not limited thereto, and the uneven pattern 21 may be formed by using a different method.

Next, an electrode active material layer 40 is formed on the uneven pattern 21 in a state that a tensile force is applied to the polymer substrate 20 in step S140 (referring to FIG. 7(d)).

Herein, the tensile force may be applied in one direction (the X or Y direction) or in two directions that are perpendicular to each other (the X and Y directions) with respect to the uneven pattern depending on the specific embodiment as above-described with reference to FIG. 1 to FIG. 5.

The electrode active material layer 40 may include one of a positive electrode active material and a negative electrode active material depending on a polarity of an electrode, as which a manufactured electrode structure will be employed.

When a positive electrode active material layer is formed as the electrode active material layer 40, the positive electrode active material in the present exemplary embodiment may include, e.g., a positive electrode material, a binder, and a conductive material. The positive electrode material may be an active material of a metal oxide including lithium. For example, an oxide such as a lithium cobalt oxide, a polyanion such as a lithium iron phosphate (LiFePO$_4$), a lithium manganese oxide, or a spinel may be employed as the positive electrode material. However, various materials besides the above materials may be employed as the positive electrode material, and the present invention is not limited to any particular material.

The binder may be included to fix the positive electrode material on the polymer substrate 20, and the conductive material may be included to facilitate a flow of electrons or charges. For example, carbon may be employed as the conductive material.

When a negative electrode active material layer is formed as the electrode active material layer 40, the negative electrode active material in the present exemplary embodiment may include, e.g., a negative electrode material, a binder, and a conductive material. Graphite, a lithium titanate oxide (LTO), or the like may be employed as the negative electrode material. However, various materials besides the above materials may be employed as the negative electrode material, and the present invention is not limited to any particular material.

Similar to the positive electrode active material, the binder may be included to fix the negative electrode material on the polymer substrate 20, and the conductive material may be included to facilitate the flow of the electrons or the charges. For example, carbon may be employed as the conductive material.

In the exemplary embodiment of the present invention, the electrode active material layer 40 is formed by coating the aforementioned positive or negative electrode active material on the polymer substrate 20 in step S140. Herein, since the uneven pattern 21 is formed on the polymer substrate 20, the coated electrode active material layer 40 has an identical uneven pattern to the uneven pattern 21.

Then, the tensile force applied to the polymer substrate 20 is removed to form an additional uneven pattern on the polymer substrate 20 and the electrode active material layer 40 as shown in FIG. 7(*e*) at step S150. That is, the tensile force is removed such that the polymer substrate 20 returns to an initial length, and thus the additional uneven pattern is formed on the uneven pattern 21 as described with reference to FIG. 1. Accordingly, the specific surface area of the polymer substrate 20 may be significantly increased by forming a hierarchical structure in which the additional uneven pattern that is smaller than the uneven pattern 21 is formed thereon.

As described above, according to the first exemplary embodiment of the present invention, it is possible to form the additional uneven pattern on the polymer substrate 20 in which the uneven pattern 21 is pre-patterned by applying the tensile force to the polymer substrate 20 so as to maximize a surface area of the polymer substrate 20, thereby improving an energy density thereof. Accordingly, a 3-dimensionally structured electrode may be formed without a separate process such as chemical etching or photolithography unlike the conventional art.

Further, a bonding defect may be prevented even the substrate 20 and the electrode active material layer 40 are extended or bended because the substrate 20 and the electrode active material layer 40 have a structural flexibility and extensity due to the hierarchical structure of the uneven patterns formed thereon. Accordingly, it may be advantageous to be employed as an electrode structure for an energy storage device of a wearable device.

Meanwhile, an additional process may be performed on the substrate 20 and the electrode active material layer 40 for forming the electrode structure, although it is not illustrated in FIG. 6 and FIG. 7. For example, a curing step may be performed by radiating a microwave or UV light to the substrate 20 to bond the electrode active material layer 40. Alternatively, another layer may be interposed between the substrate 20 and the electrode active material layer 40 so as to increase a bonding strength therebetween, or, if necessary, a surface of the electrode active material layer 40 may be modified or another layer may be stacked thereon. However, such an additional process is not directly related to the electrode structure according to the first exemplary embodiment of the present invention, so descriptions thereof will be omitted.

Further, the electrode structure has been described as an example of a lithium-ion rechargeable battery in the above-described exemplary embodiment, but the present invention may be applied to various energy storage devices such as a rechargeable battery including a different positive or negative electrode material, a capacitor, or the like.

Figure 8:
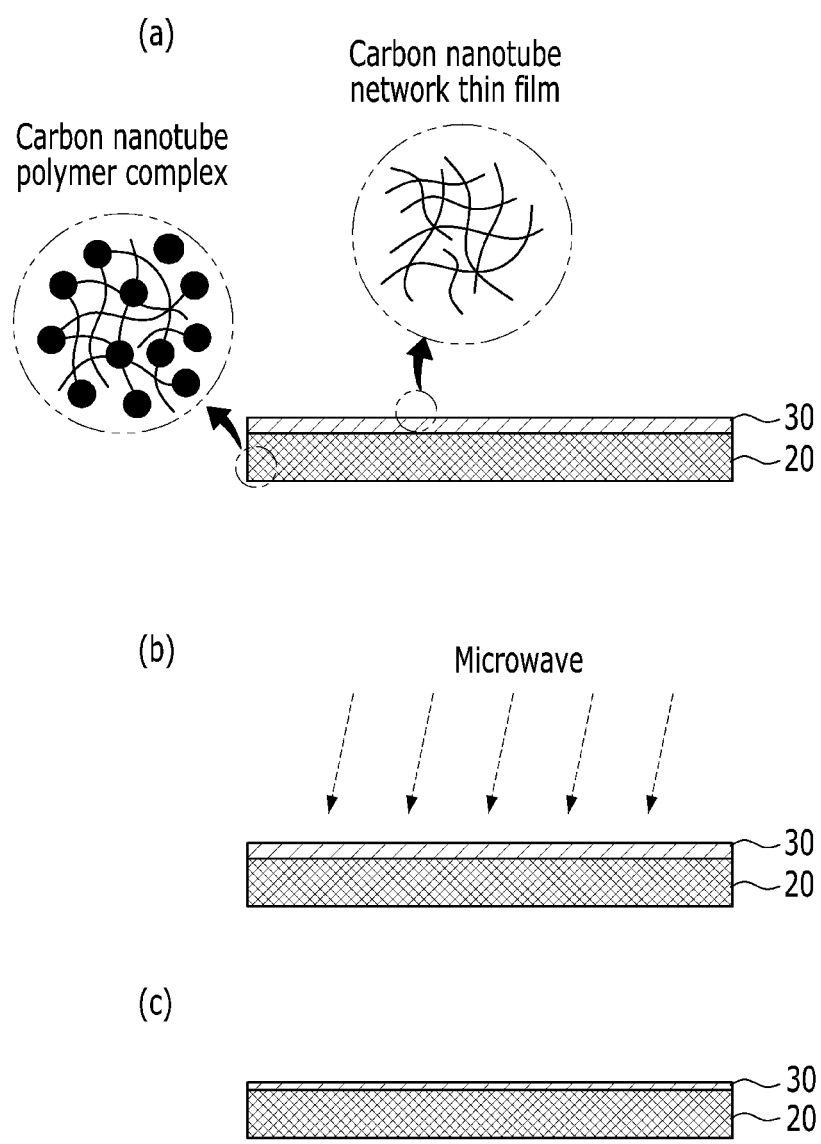
FIG. 8 illustrates an exemplary method of bonding an electrode active material layer and a polymer substrate according to an exemplary embodiment of the present invention.

FIG. 8 illustrates an exemplary method of bonding the electrode active material layer and the polymer substrate according to an exemplary embodiment of the present invention.

According to the exemplary embodiment of the present invention, an electrode structure in which a bonding strength is increased between the polymer substrate and the electrode active material. To that end, a carbon nanotube (CNT) network thin film 30 is stacked on a surface the extensible polymer substrate 20 as shown in FIG. 8(*a*). For example, the polymer substrate 20 may be a complex of a carbon nanotube (CNT) and a polymer.

Then, a microwave is radiated on the substrate 20 as shown in FIG. 8(*b*), so the CNT network thin film 30 is impregnated into the CNT polymer substrate 20, thereby improving the bonding strength between the network thin film 30 and the substrate 20. As a result, the radiating of the microwave on the substrate 20 without a separate bonding process may impregnate the network thin film 30 into the extensible polymer substrate 20, thereby increasing the bonding strength.

Figure 9:
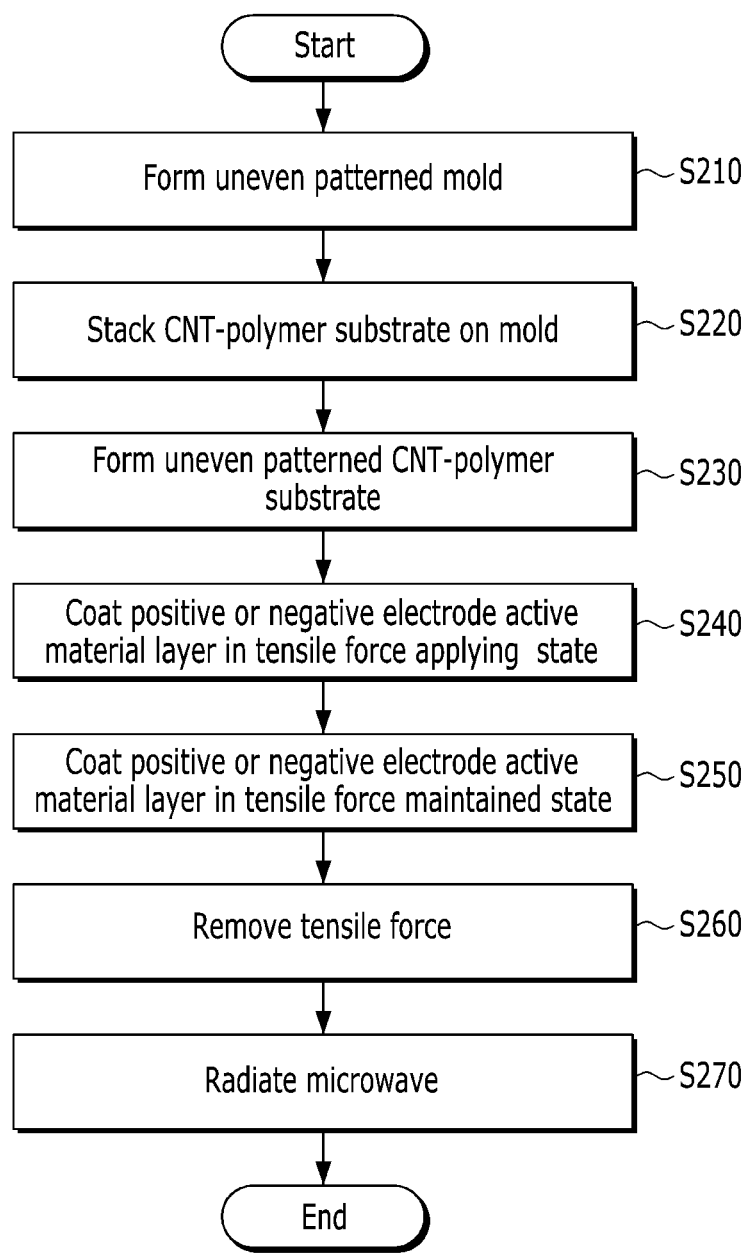
FIG. 9 illustrates a manufacturing method of an electrode structure according to a second exemplary embodiment of the present invention.
Figure 10:
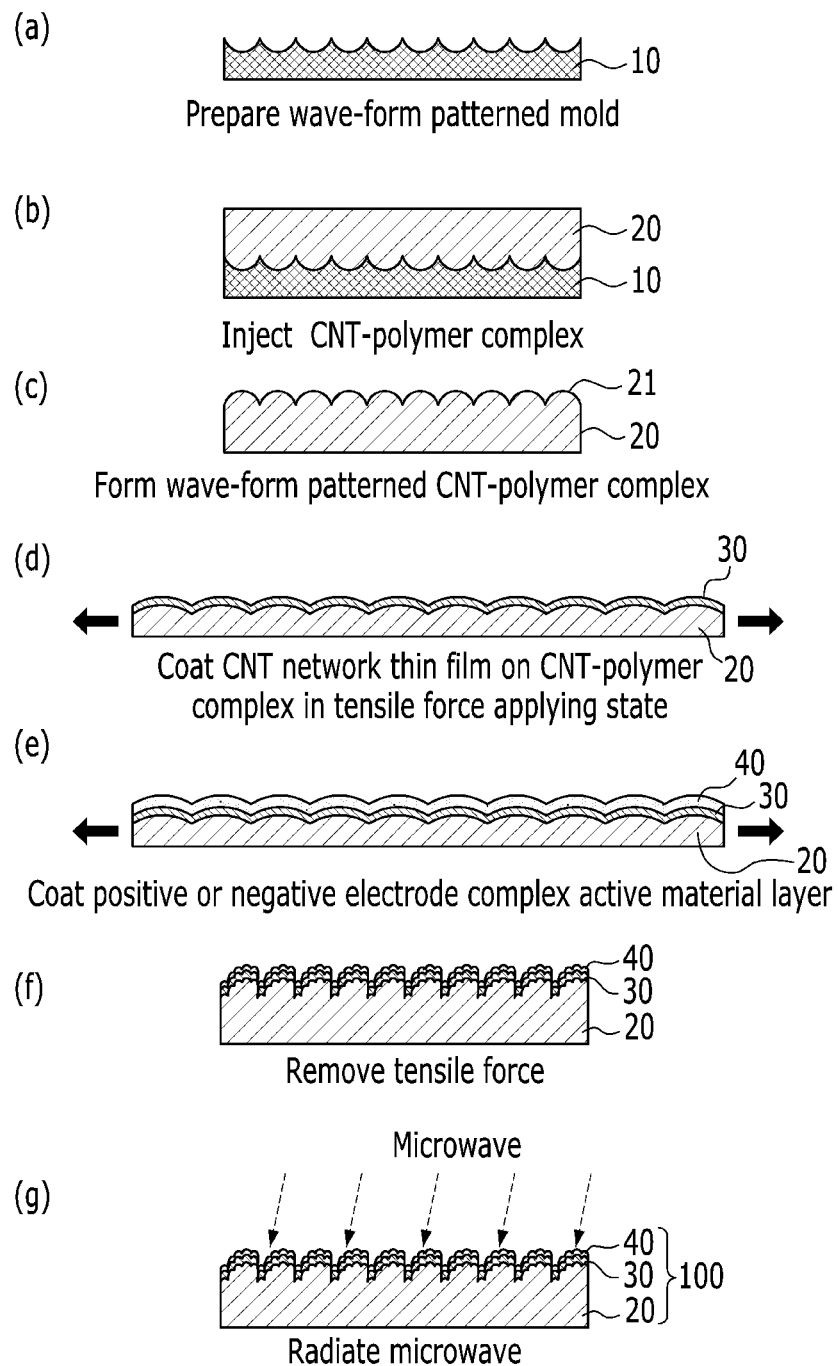
FIG. 10 schematically illustrates a manufacturing process of an electrode structure according to the method illustrated in FIG. 9.

FIG. 9 is a flowchart illustrating a manufacturing method of an electrode structure, which employs the above-described method illustrated in FIG. 8, according to a second exemplary embodiment of the present invention, and FIG. 10 schematically illustrates a manufacturing process of the electrode structure according to the method illustrated in FIG. 9.

Referring to FIG. 9 and FIG. 10, the mold 10 in which an uneven pattern is formed is prepared in step S210. The uneven pattern may have the wave form as shown in FIG. 10(*a*). However, the shape and numerical values of the uneven pattern may vary depending on a specific embodiment.

Then, the carbon nanotube (CNT) polymer substrate 20 is stacked on the mold 10 in step S220, and the mold 10 is separated from the polymer substrate 20, thereby forming the polymer substrate 20 having the uneven pattern 21 is formed in step S230 (referring to FIG. 10(*b*) and FIG. 10(*c*)).

In steps S210 to S230, the method that employs the mold 10 to form the substrate 20 having the uneven pattern 21 has been described as an example, but it is obvious that the substrate 20 may be implemented to have the uneven pattern 21 by a different method.

Next, the carbon nanotube (CNT) network thin film 30 is coated on the uneven pattern 21 in the state that a tensile force is applied to the polymer substrate 20 in step S240 (referring to FIG. 10(*d*)). Then the electrode active material layer 40 is formed on the CNT network thin film 30 in the state that the tensile force is maintained in step S250 (referring to FIG. 10(e)). The electrode active material layer 40 may include one of a positive electrode active material and a negative electrode active material depending on the polarity of the electrode, as which the manufactured electrode structure will be employed. The positive electrode active material and the negative electrode active material may be an active material complex including the positive electrode material (or the negative electrode material), the binder, and the conductive material as described with reference to FIG. 6 and FIG. 7.

Then, the tensile force applied to the substrate 20 is removed in step S260, and a microwave is radiated to the electrode active material layer 40 at step S270. Hence, as described with reference to FIG. 8, the CNT network thin film 30 is impregnated into the CNT polymer substrate 20, thereby improving a bonding strength between the electrode active material layer 40, the network thin film 30, and the substrate 20. Accordingly, an electrode structure 100 having an improved bonding strength there between may be obtained.

As described above, according to the second exemplary embodiment of the present invention, a tensile force may be applied to a substrate having a surface that is pre-patterned to have a first uneven pattern, and thus a second uneven pattern is formed thereon. Accordingly, a surface area of the substrate can be maximized, thereby improving an energy density and a bonding strength between the substrate and an electrode active material layer. Accordingly, the bonding strength between the substrate and the electrode layer may be improved and the 3-dimensionally structured electrode may be formed without a separate process such as the chemical etching or the photolithography unlike the conventional art.

Figure 11:
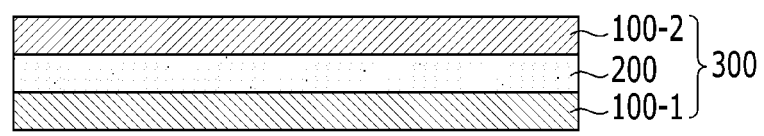
FIG. 11 schematically illustrates an energy storage device that includes an electrode structure manufactured according to an exemplary embodiment of the present invention.

FIG. 11 schematically illustrates an energy storage device that includes an electrode structure manufactured according to an exemplary embodiment of the present invention.

The energy storage device according to the illustrated exemplary embodiment may include a first electrode structure 100-1 that serves as a positive electrode, a second electrode structure 100-2 that serves as a negative electrode, and an electrolyte layer interposed between the first electrode structure 100-1 and the second electrode structure 100-2. Herein, at least one of the first and second electrode structures 100-1 and 100-2 may be the electrode structure according to the first exemplary embodiment described with reference to FIG. 6 and FIG. 7 or the electrode structure according to the second exemplary embodiment described with reference to FIG. 9 and FIG. 10.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A manufacturing method of an electrode structure for an energy storage device, the method comprising:
   forming a polymer substrate configured to have a first uneven pattern on a first surface thereof;
   forming an electrode active material layer on the first uneven pattern in a state that an tensile force is applied to the polymer substrate; and
   forming a second uneven pattern on the polymer substrate and the electrode active material layer by removing the tensile force.

2. The method of claim 1, wherein the forming of the polymer substrate comprises:
   forming a mold formed to have the first uneven pattern;
   stacking a polymer substrate on the mold; and
   separating the mold from the polymer substrate.

3. The method of claim 1, wherein the electrode active material layer is a positive electrode active material layer or a negative electrode active material layer.

4. The method of claim 3, wherein the positive electrode active material layer comprises a positive electrode active material, a binder, and a conductive material.

5. The method of claim 1, wherein the forming of the electrode active material layer comprises:
   coating a carbon nanotube (CNT) network thin film on the first uneven pattern in the state that the tensile force is applied to the polymer substrate; and
   applying the electrode active material layer on the CNT network thin film in the state that the tensile force is maintained.

6. The method of claim 5, wherein the polymer substrate is formed of a complex of a CNT and a polymer.

7. The method of claim 5 further comprising
   radiating a microwave on the electrode active material, after the forming of the second uneven pattern.

* * * * *